(12) United States Patent
Nakagawa et al.

(10) Patent No.: US 12,217,281 B2
(45) Date of Patent: Feb. 4, 2025

(54) INFORMATION DISTRIBUTION MANAGEMENT DEVICE

(71) Applicant: NTT DOCOMO, INC., Chiyoda-ku (JP)

(72) Inventors: Tomohiro Nakagawa, Chiyoda-ku (JP); Kazuma Nozawa, Chiyoda-ku (JP); Kazuya Sasaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 18/006,217

(22) PCT Filed: Sep. 3, 2021

(86) PCT No.: PCT/JP2021/032476
§ 371 (c)(1),
(2) Date: Jan. 20, 2023

(87) PCT Pub. No.: WO2022/054716
PCT Pub. Date: Mar. 17, 2022

(65) Prior Publication Data
US 2023/0342810 A1    Oct. 26, 2023

(30) Foreign Application Priority Data

Sep. 14, 2020 (JP) ................................. 2020-153634

(51) Int. Cl.
*G06Q 30/02* (2023.01)
*G06Q 30/0242* (2023.01)
*G06Q 30/0272* (2023.01)

(52) U.S. Cl.
CPC ..... *G06Q 30/0246* (2013.01); *G06Q 30/0272* (2013.01)

(58) Field of Classification Search
CPC .. H04N 21/812; H04N 5/783; G06F 18/2413; G01B 21/045; G06Q 30/02; G06T 7/12
See application file for complete search history.

(56) References Cited

U.S. PATENT DOCUMENTS

| 9,870,629 B2* | 1/2018 | Cardno | .................. G06Q 30/02 |
| 2009/0217315 A1* | 8/2009 | Malik | .................... H04N 7/181 |
| | | | 725/9 |

(Continued)

OTHER PUBLICATIONS

International Search Report issued Dec. 7, 2021 in PCT/JP2021/032476 filed Sep. 3, 2021, 2 pages.

(Continued)

*Primary Examiner* — Saba Dagnew
(74) *Attorney, Agent, or Firm* — Oblon, McClelland, Maier & Neustadt, L.L.P.

(57) ABSTRACT

To provide an information distribution management device configured to analyze distribution in consideration of the number of unique users.
An advertisement management device 100 includes a heat map generation unit 101 configured to generate a heat map indicating the necessity of advertisement distribution to a designated target layer for each of a plurality of units of digital signage 300 and for each time slot, a reach curve generation unit 103 configured to function as a viewing estimation unit that estimates the viewing frequency of unique users of the target layer for the digital signage 300 to which the heat map is applied, and an evaluation unit 104 configured to evaluate the heat map on the basis of the number of viewers who are unique users of the target layer (equivalent to viewing frequency) and the total number of viewers who are all users to whom the heat map is applied (viewing frequency).

19 Claims, 14 Drawing Sheets

(56) References Cited

U.S. PATENT DOCUMENTS

| | | | |
|---|---|---|---|
| 2011/0262049 A1* | 10/2011 | Sun | G06T 7/12 382/233 |
| 2013/0031266 A1* | 1/2013 | Gilson | H04N 21/2387 709/232 |
| 2019/0172099 A1 | 6/2019 | Soupliotis et al. | |
| 2019/0253743 A1* | 8/2019 | Tanaka | H04N 21/812 |
| 2020/0355066 A1* | 11/2020 | Maus | E21B 44/00 |
| 2021/0264161 A1* | 8/2021 | Saraee | G06F 18/2413 |
| 2021/0385426 A1* | 12/2021 | Ebner | G06Q 30/02 |

OTHER PUBLICATIONS

International Preliminary Report on Patentability and Written Opinion issued on Mar. 23, 2023, in PCT/JP2021/032476, 5 pages.

* cited by examiner (a)
USER POSITION INFORMATION

| UID | POSITION | TIME | TARGET |
|---|---|---|---|
| 10001 | x, y | xxxxxx | MALE, 20s |
| 110001 | x1, y1 | xxxxxx | FEMALE, 30s |
| 10002 | x2, y2 | xxxxxx | MALE, 30s |
| ... | ... | ... | ... |

(b)
POSITION OF DIGITAL SIGNAGE

| DS1 | x10, y10 |
|---|---|
| DS2 | x10, y11 |
| ... | |

(c)
ORIGINAL INFORMATION

| DS1 | UID |
|---|---|
| | 10001 |
| | 10002 |
| | ... |

| DS2 | UID |
|---|---|
| | 10001 |
| | 10002 |
| | 110001 |
| | ... |

| DS3 | UID |
|---|---|
| | 10003 |
| | 10002 |
| | 110001 |
| | ... |

USER CORRELATION INFORMATION

| | 1 | 2 | ·· | 11 |
|---|---|---|---|---|
| 1 | 1 | 0.9 | ·· | 0.1 |
| 2 | 0.9 | 1 | ·· | 0.6 |
| : | : | : | ·· | : |
| 11 | 0.1 | 0.6 | ·· | 1 |

| DATE | TIME SLOT | A NUMBER OF TARGET UUs (ALL DISTRIBUTION SURFACES) | B TOTAL NUMBER OF TARGET USERS FOR EACH TIME SLOT | | | |
|---|---|---|---|---|---|---|
| | | | DISTRIBUTION SURFACE 1 | DISTRIBUTION SURFACE 2 | ... | DISTRIBUTION SURFACE N |
| XXXX/XX/01 | 7 | 826 | | 543 | ... | 132 |
| XXXX/XX/01 | 8 | 2793 | | | ... | 423 |
| XXXX/XX/01 | 9 | 9876 | | 324 | ... | |
| XXXX/XX/01 | 10 | 15062 | | 241 | ... | |
| XXXX/XX/01 | 11 | 20524 | | | ... | |
| XXXX/XX/01 | 12 | 27674 | 897 | | ... | |
| XXXX/XX/01 | 13 | 32525 | | | ... | |
| XXXX/XX/01 | 14 | 38112 | 844 | | ... | |
| XXXX/XX/01 | 15 | 44255 | 976 | | ... | |
| XXXX/XX/01 | 16 | 50775 | | | ... | |
| XXXX/XX/01 | 17 | 57669 | | | ... | |
| XXXX/XX/01 | 18 | 69260 | 1540 | | ... | |
| XXXX/XX/01 | 19 | 79296 | 1312 | | ... | |
| XXXX/XX/01 | 20 | 86339 | 1010 | | ... | |
| XXXX/XX/01 | 21 | 92061 | 890 | | ... | |
| XXXX/XX/01 | 22 | 94944 | 787 | | ... | |
| XXXX/XX/01 | 23 | 97630 | 595 | | ... | |
| ... | ... | ... | ... | ... | ... | ... |

(b)

| DATE | TIME SLOT | A NUMBER OF TARGET UUs | B' CUMULATIVE TOTAL NUMBER OF USERS | UU RATE r |
|---|---|---|---|---|
| XXXX/XX/01 | 7 | 826 | 826 | 100% |
| XXXX/XX/01 | 8 | 2793 | 2928 | 95% |
| XXXX/XX/01 | 9 | 9876 | 12009 | 82% |
| XXXX/XX/01 | 10 | 15062 | 21713 | 69% |
| XXXX/XX/01 | 11 | 20524 | 33599 | 61% |
| XXXX/XX/01 | 12 | 27674 | 47855 | 58% |
| XXXX/XX/01 | 13 | 32525 | 59900 | 54% |
| XXXX/XX/01 | 14 | 38112 | 77099 | 49% |
| XXXX/XX/01 | 15 | 44255 | 96703 | 46% |
| XXXX/XX/01 | 16 | 50775 | 113028 | 45% |
| XXXX/XX/01 | 17 | 57669 | 130193 | 44% |
| XXXX/XX/01 | 18 | 69260 | 162127 | 43% |
| XXXX/XX/01 | 19 | 79296 | 191188 | 41% |
| XXXX/XX/01 | 20 | 86339 | 215261 | 40% |
| XXXX/XX/01 | 21 | 92061 | 235852 | 39% |
| XXXX/XX/01 | 22 | 94944 | 247743 | 38% |
| XXXX/XX/01 | 23 | 97630 | 262104 | 37% |
| ... | ... | ... | ... | ... |

(a)

| DATE | TIME SLOT | ① TARGET IMP Simp | UU RATE r | ② TARGET REACH R (Simp*r) | ③ OVERALL IMP |
|---|---|---|---|---|---|
| XXXX/XX/01 | 6 | 0 | - | 0 | 0 |
| XXXX/XX/01 | 7 | 2871 | 100% | 2871 | 100976 |
| XXXX/XX/01 | 8 | 12105 | 95% | 11547 | 183009 |
| XXXX/XX/01 | 9 | 59780 | 82% | 49162 | 264069 |
| XXXX/XX/01 | 10 | 130485 | 69% | 90516 | 340515 |
| XXXX/XX/01 | 11 | 252497 | 61% | 154238 | 416457 |
| XXXX/XX/01 | 12 | 398925 | 58% | 230694 | 494429 |
| XXXX/XX/01 | 13 | 549769 | 54% | 298518 | 582866 |
| XXXX/XX/01 | 14 | 749452 | 49% | 370473 | 709067 |
| XXXX/XX/01 | 15 | 973442 | 46% | 445484 | 920776 |
| XXXX/XX/01 | 16 | 1132203 | 45% | 508614 | 1190733 |
| XXXX/XX/01 | 17 | 1218975 | 44% | 539945 | 1485533 |
| XXXX/XX/01 | 18 | 1373478 | 43% | 586744 | 1817785 |
| XXXX/XX/01 | 19 | 1555724 | 41% | 645243 | 2185619 |
| XXXX/XX/01 | 20 | 1711764 | 40% | 686571 | 2573333 |
| ⋮ | ⋮ | ⋮ | ⋮ | ⋮ | ⋮ |

(b)

OVERALL IMPRESSION

INFORMATION DISTRIBUTION MANAGEMENT DEVICE

TECHNICAL FIELD

The present invention relates to an information distribution management device that manages distribution of information such as advertisements.

BACKGROUND ART

Patent Literature 1 describes that, in outdoor advertisements, distribution content and a distribution surface are optimally selected on the basis of demographic attribute information.

CITATION LIST

Patent Literature

[Patent Literature 1] Specification of United States Patent Application Publication No. 2019/0172099

SUMMARY OF INVENTION

Technical Problem

However, in the technique disclosed in Patent Literature 1, a user may duplicately view the advertisement. Therefore, it is difficult to select an optimum distribution surface based on the number of unique users (the number of viewers).

Consequently, in order to solve the above-described problem, an object of the present invention is to provide an information distribution management device that analyzes distribution in consideration of the number of unique users.

Solution to Problem

According to the present invention, there is provided an information distribution management device configured to manage an information distribution device that distributes information to a plurality of information display devices, the management device including: a heat map generation unit configured to generate a heat map indicating the necessity of information distribution to a designated target layer for each of the plurality of information display devices and for each time slot; a viewing estimation unit configured to estimate the number of users of unique viewing by unique users of the target layer and the number of views by all users for an information display device to which the heat map is applied; and an evaluation unit configured to evaluate the heat map on the basis of the number of unique viewing users of the target layer and the number of views by all users to which the heat map is applied.

With such a configuration, it is possible to evaluate the effect of distribution based on the number of views by unique users of a target layer.

Advantageous Effects of Invention

According to the present invention, it is possible to evaluate the effect of distribution based on the number of views by unique users of a target layer.

BRIEF DESCRIPTION OF DRAWINGS

FIG. 9 is a diagram illustrating a procedure of calculating the cumulative total number of users generated by a UU rate generation unit 102.

DESCRIPTION OF EMBODIMENTS

Figure 1:
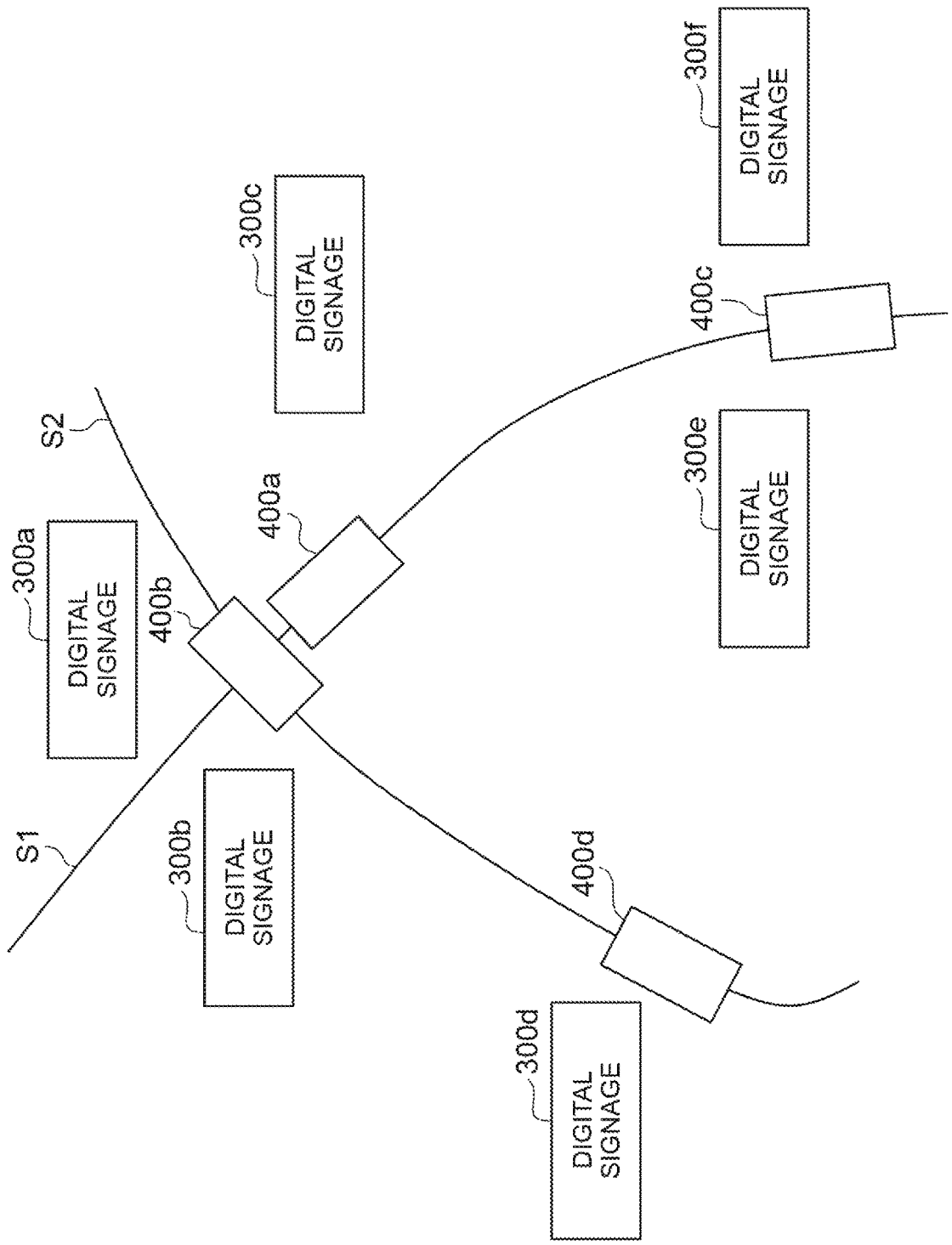
FIG. 1 is a conceptual diagram illustrating an arrangement of digital signage 300 serving as a distribution destination of an advertisement distribution device in the present disclosure.

An embodiment of the present disclosure will be described with reference to the accompanying drawings. The same components are denoted, if possible, by the same reference numerals and signs, and thus description thereof will not be repeated.

FIG. 1 is a conceptual diagram illustrating an arrangement of digital signage 300 serving as a distribution destination of an advertisement distribution device in the present disclosure. The digital signage 300 is an information display device that displays advertisements. As shown in the drawing, the digital signage 300 (300a to 3000 is disposed outdoors near a station 400 (400a to 400c). Generally, the digital signage 300 is often disposed outdoors, but may be disposed indoors. A user (passerby) who passes near the digital signage 300 can view advertisements displayed on the digital signage 300.

The user may pass near a plurality of units of digital signage 300. In a case where the plurality of units of digital signage 300 display the same advertisement, the user will see the same advertisement many times.

Therefore, it is efficient to divide the digital signage 300 into groups in accordance with a predetermined rule and display different advertisements for each group.

For example, in FIG. 1, the digital signage 300e and the digital signage 300f are disposed near the station 400c. The user who uses the station 400c may duplicately view advertisements displayed on both the units of digital signage 300e and 300f. In that case, only one of them needs to display an advertisement. It is efficient to display a different advertisement on the other digital signage.

In addition, similarly, the stations 400a to 400c are on the same track S1. Therefore, the user often using (getting on and off at) the stations 400a to 400c can be considered. In that case, it is not efficient to distribute the same advertisement to the digital signage 300a to 300f, excluding the digital signage 300d.

In such a case, it is efficient to display an advertisement on any one of the digital signage 300a to 300f other than the digital signage 300d, and not to display the advertisement on the other digital signage or to display a different advertisement.

In addition, the number of users (the number of viewers) who view advertisements is totalized on the basis of position information of the users' portable terminals, but the position information of the same user (portable terminal) may be totalized many times. Therefore, the same user will view the advertisement many times, and thus the numerical value may not be appropriate for measuring the effect of the advertisement.

An advertisement management device 100 of the present disclosure performs analysis and management for efficiently distributing advertisements displayed on such digital signage 300.

Figure 2:
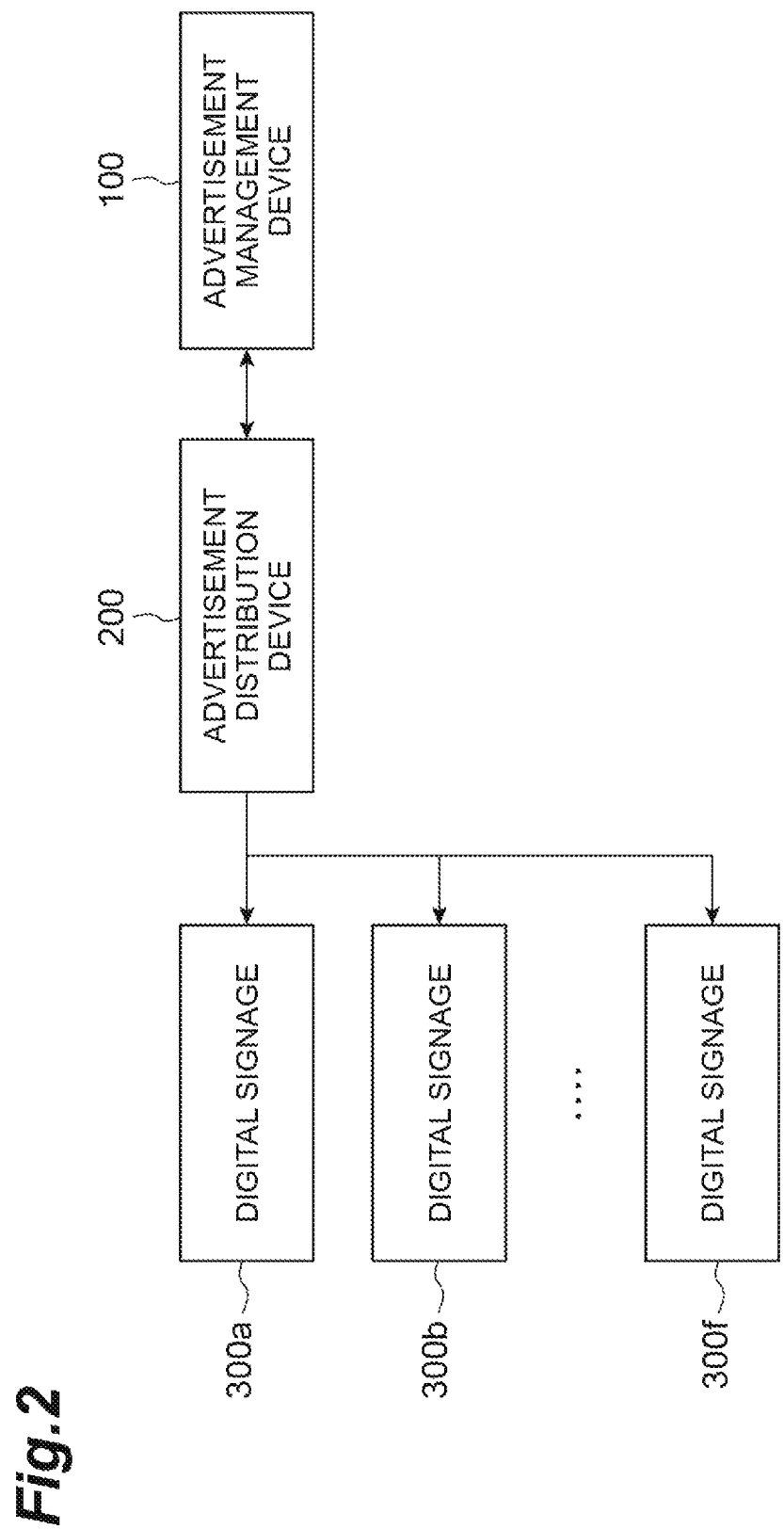
FIG. 2 is a diagram illustrating a system configuration of an advertisement management system of the present disclosure.

FIG. 2 is a diagram illustrating a system configuration of an advertisement management system of the present disclosure. As shown in the drawing, this advertisement management system is configured to include the advertisement management device 100, an advertisement distribution device 200, and the digital signage 300a to 300f. Meanwhile, the number of units of digital signage 300 is not limited to seven, and may be more.

The advertisement distribution device 200 is a device that transmits advertisement information to the digital signage 300 and displays the advertisement. The advertisement distribution device 200 designates a time slot of advertisement display determined in advance and the digital signage 300 that displays the advertisement, and distributes the advertisement. Each unit of the digital signage 300a to 300f displays the distributed advertisement during the designated time slot. The advertisement distribution device 200 determines advertisements to be distributed in accordance with an instruction from the advertisement management device 100.

The advertisement management device 100 is a device that analyzes a user's advertisement viewing or the like on the basis of the viewable region (or the arrangement position) of the digital signage 300. That is, the advertisement management device 100 analyzes how many users (passersby) of a target layer designated in advance (so-called attributes) have passed by which position (near the digital signage 300) at which time slot on the basis of a history of user position information. The advertisement management device 100 generates a heat map composed of a matrix of time slots and the digital signage 300 for each target on the basis of the analysis result, and evaluates advertisement distribution according to the heat map.

Figure 3:
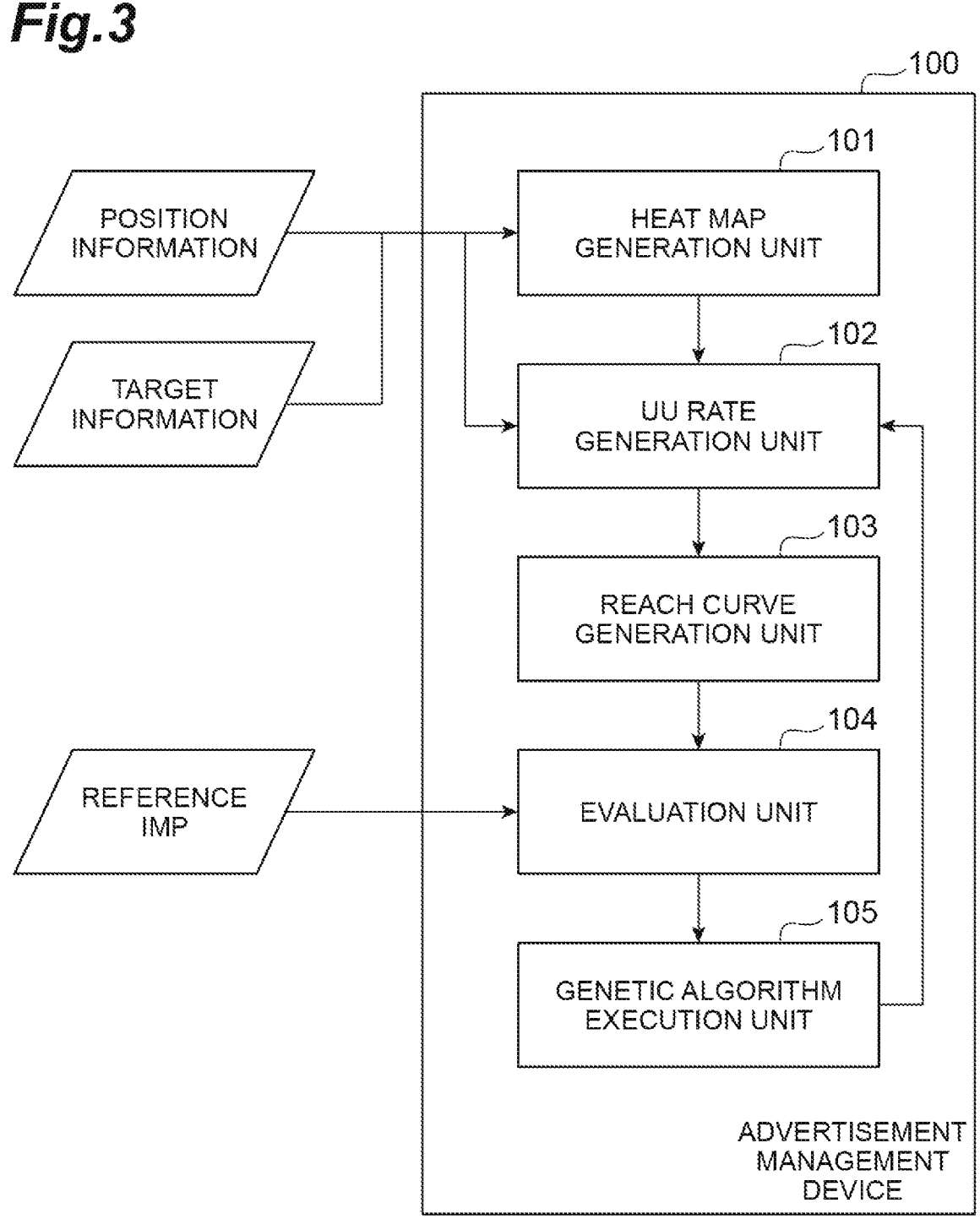
FIG. 3 is a block diagram illustrating a functional configuration of an advertisement management device 100 of the present disclosure.

FIG. 3 is a block diagram illustrating a functional configuration of the advertisement management device 100 of the present disclosure. As shown in the drawing, the advertisement management device 100 is configured to include a heat map generation unit 101, a UU rate generation unit 102, a reach curve generation unit 103, an evaluation unit 104, and a genetic algorithm execution unit 105. Meanwhile, the genetic algorithm execution unit 105 is not essential in a case where the process does not use a genetic algorithm.

Figure 4:
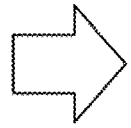
FIG. 4 is a diagram illustrating tables in which various types of information are stored.

The heat map generation unit 101 is a portion that generates a heat map according to a designated analysis condition (target layer). The heat map is matrix-shaped map information indicating the digital signage 300 that displays an advertisement and a time slot at which the advertisement is displayed. The heat map generation unit 101 uses information consisting of user position information acquired on the basis of the GPS function of the user's portable terminal or other location positioning functions, the positioning time, and target information as original data, and generates a heat map on the basis of the original data. The original data includes a portable terminal ID (or a user ID), position information, and positioning time, and is provided from a position information server (not shown). The position information server stores position information, a positioning time, and target information which is a user attribute for each user ID, for example, as shown in FIG. 4(*a*).

Figure 5:
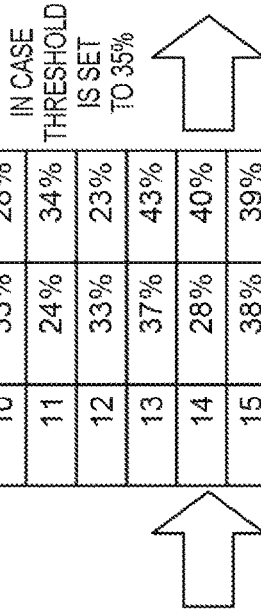
FIG. 5 is a diagram illustrating a procedure of generating a heat map generation process.

FIG. 5 shows a diagram illustrating a procedure of generating a heat map generation process. As shown in FIG. 5(*a*), the heat map generation unit 101 acquires the overall IMP, target IMP, and target content rate for each time slot on any date. In the present disclosure, the time slot is set to 7:00 to 23:00 for advertisement evaluation, but other time slots may be used.

The overall impression (IMP) indicates the number of times the user viewed the advertisement of the digital signage 300 to which a heat map was applied (the number of views) at each time slot when the heat map was applied. The number of views is calculated by multiplying the amount of passage (the number of users) indicating the total number of people who have passed through the viewable region (predetermined region on the display surface side) of the digital signage 300 by a predetermined viewing coefficient. Since the amount of passage is the total number of people who pass through the viewable region, the amount of passage is multiplied by a predetermined viewing coefficient (1 or less), and it is possible to acquire the number of times the advertisement was actually visually recognized among the number of people who passed by. This viewing coefficient is set for each predetermined area, and when the number of pieces of position information is counted, the heat map generation unit 101 determines which area the position information belongs to, and performs a multiplication process on the viewing coefficient.

In the present disclosure, the amount of passage is a value estimated from the position information of the portable terminal. For example, it is obtained by multiplying the number of pieces of position information by a predetermined coefficient (for example, the ratio of the number of subscribers of a communication carrier to the population). The number of views is a value obtained by multiplying the amount of passage by a predetermined viewing coefficient, but the value may be calculated through another process. Meanwhile, the overall IMP is a sum of advertisements viewed by duplicate users multiple times. That is, the overall IMP indicates the total number of views.

The target IMP indicates the number of views by the user who is a target of the advertisement (the number of target views), and indicates the total number of views calculated by multiplying the amount of passage of target users who actually passed through the viewable region of the digital signage 300 by the viewing coefficient. Here, the number of views by the target to be analyzed indicated by analysis conditions is calculated for each day and for each time slot. The target is determined on the basis of the user's attributes and is determined by age, gender, tastes and preferences, occupation, and the like.

The target content rate is calculated on the basis of the target IMP/the overall IMP.

The heat map generation unit 101 generates information on the average target content rate shown in FIG. 5(*b*) on the basis of target content rate information of FIG. 5(*a*). FIG.

5(b) is a diagram illustrating average values of content rates on weekdays and holidays. The target content rate information shown in FIG. 5(a) indicates the target content rate for each predetermined time slot on a certain day, but this information is actually generated every day. The heat map generation unit 101 generates information on the average target content rate on weekdays and holidays from information for a predetermined period in the past. As shown in FIG. 5(c), the heat map generation unit 101 generates flag information for a heat map of one unit of digital signage 300 by adding a flag of 1 when the target content rate is 35% or more and 0 when it is less than 35% with a threshold of, for example, 35%. Here, distribution is enabled in a case where the flag is 1, and distribution is disabled in a case where the flag is 0.

Figure 6:
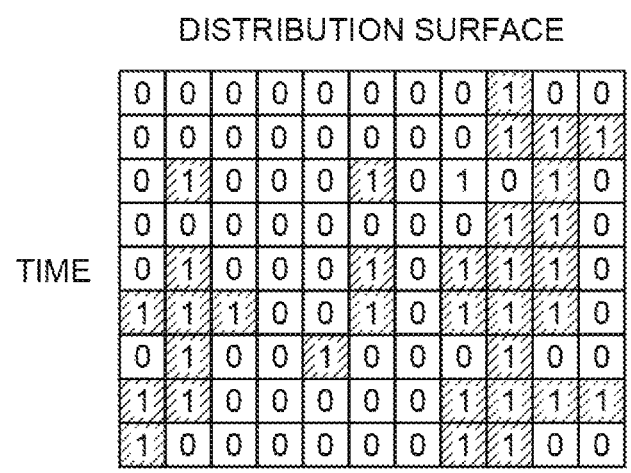
FIG. 6 is a conceptual diagram of a heat map.

The heat map generation unit 101 performs the above process for each unit of digital signage 300 which is an advertisement distribution surface to generate a final heat map. FIG. 6 is a conceptual diagram of the heat map. The vertical axis represents a time slot, and the horizontal axis represents a distribution surface (digital signage). The heat map generation unit 101 can generate heat maps for weekdays or holidays using the content rate or the flag information for weekdays or holidays as described above.

Further, the heat map generation unit 101 may perform the following processing. That is, the heat map generation unit 101 clusters the digital signage 300 on the basis of the viewable region of the digital signage 300 (which may be position information). For example, a k-means method is used. In this case, k is set to be the same as the number of heat map outputs.

The heat map generation unit 101 generates a heat map for displaying an advertisement on one randomly select digital signage 300 among the digital signage 300 within the same cluster. The heat map generation unit 101 has digital signage position information as shown in FIG. 4(b), and enables a clustering process on the basis of this.

The heat map generation unit 101 may consider the target content rate when one unit of digital signage 300 is selected within one cluster. That is, the target content rate may be randomly selected from portions having a certain rate or higher.

Figure 7:
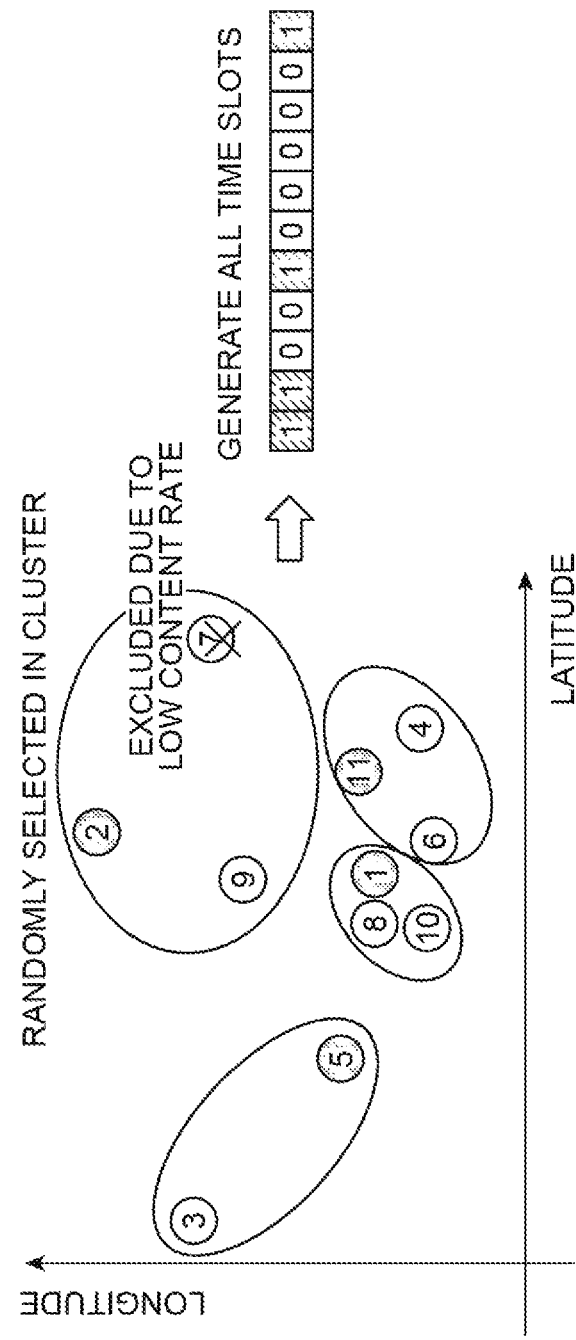
FIG. 7 is a diagram illustrating a procedure of generating a heat map in which a content rate and a positional relationship are combined with each other.

Here, a process of generating a heat map in which the content rate and the positional relationship among the digital signage 300 are combined with each other will be described with reference to the drawings. FIG. 7 is a diagram illustrating a procedure of generating a heat map in which the content rate and the positional relationship are combined with each other. As shown in the drawing, it is assumed that there is digital signage of NO1 to NO11. Here, clustering is performed on the basis of latitude and longitude. For example, in the drawing, the digital signage 300 of NO2, 7, and 9 are grouped into the same cluster. The digital signage 300 of NO7 is excluded because of its low content rate, and one unit of digital signage 300 is randomly selected from the digital signage of NO2 and 9. Through such processes, the heat map generation unit 101 can generate a heat map in which the content rate and the positional relationship are combined with each other. Since the content rate changes for each time slot, these processes are performed for each time slot to generate a heat map. Meanwhile, the digital signage 300 is randomly selected for each time slot to generate a heat map in which the necessity of distribution is changed for each time slot.

In addition, as another process, the heat map generation unit 101 may calculate the user correlation of the digital signage 300 and cluster the digital signage 300 using this. The heat map generation unit 101 may calculate a distribution priority score with the correlation coefficient as an argument, and display an advertisement on the digital signage 300 and at a time slot where the score is equal to or greater than a threshold.

That is, the heat map generation unit 101 generates the user correlation information shown in FIG. 4(c) from original information consisting of the user position information. The original information is information indicating the user ID that was in the viewable region of the digital signage 300. In the drawing, DS1, DS2, and the like indicate the digital signage 300. The user correlation information indicates a correlation among the digital signage 300 on the basis of the degree of matching of the user ID. This creates a feature vector space of the same dimension as the number of surfaces (the digital signage 300).

The horizontal axis and the vertical axis indicate the digital signage 300. Here, it is assumed that there are eleven units of digital signage 300, and the correlation among the digital signage 300 is shown.

The heat map generation unit 101 generates a heat map by performing clustering on the basis of this user correlation information. Similarly to the above, for example, a k-means method is used. In addition, in a case where one unit of digital signage 300 is selected from the cluster, it may be random, or the target content rate may be considered.

Figure 8:
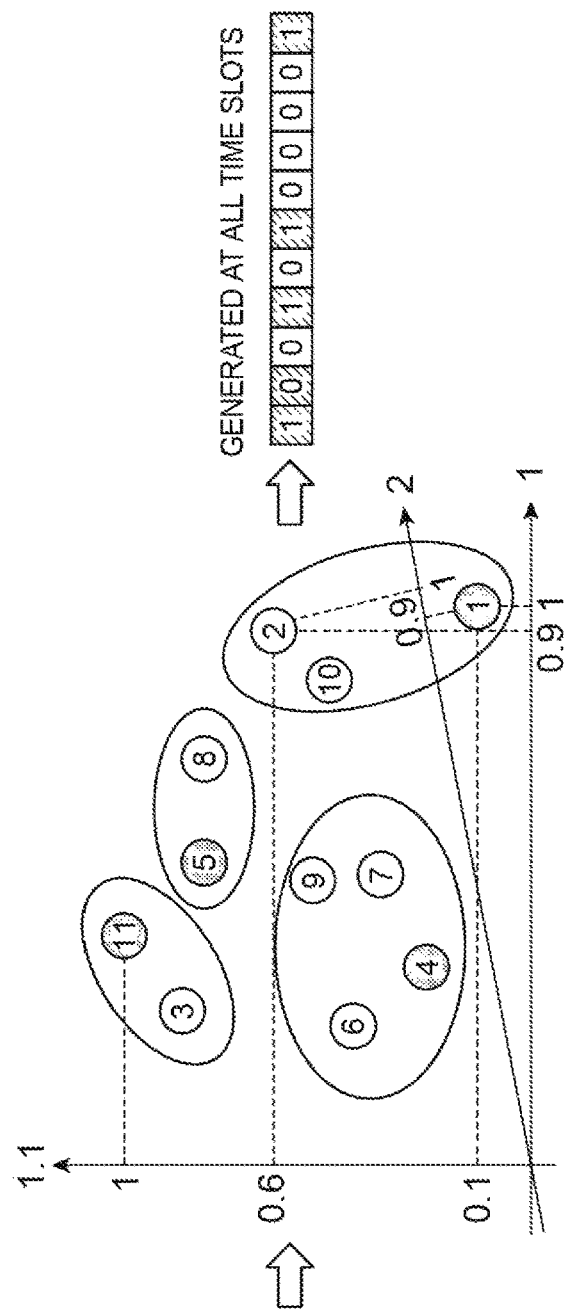
FIG. 8 is a diagram illustrating a procedure of generating a heat map in which a content rate and a user correlation are combined with each other.

FIG. 8 is a diagram illustrating a procedure of generating a heat map in which the content rate and the user correlation are combined with each other. FIG. 8(a) shows the user correlation among the digital signage 300. The correlation table here indicates how many times the same user passed by the digital signage 300. As shown in FIG. 8(b), the digital signage 300 is clustered on the basis of the user correlation, and the digital signage 300 having a low content rate is excluded in each clustered group. One digital signage 300 is randomly selected from the remaining digital signage 300. Through such a process, it is possible to generate a heat map in which the content rate and the user correlation are combined with each other. FIG. 8(b) shows an eleven-dimensional graph, but it is omitted for convenience.

In the above description, the user correlation for each unit of digital signage 300 was observed, but the correlation coefficient may be further calculated for each unit of digital signage 300 and for each time slot. A distribution priority score with the correlation coefficient as an argument may be calculated, and a heat map distributed to the digital signage 300 and at a time slot where the score is equal to or greater than a threshold may be generated.

In a case where a heat map is generated by performing clustering, it is desired that the overall IMP (the number of views) be equal to or greater than a predetermined number, and in the present disclosure, a process of selecting the digital signage is performed to obtain a predetermined number of IMPs. In a case where the overall IMP does not reach a predetermined value, a method of correcting the heat map to satisfy the condition by adding distribution surfaces and time slots having a high content rate to the heat map, or the like can be considered.

The UU rate generation unit 102 is a portion that calculates the unique user rate of the number of users of a target layer when each generated heat map is applied. That is, the UU rate generation unit 102 calculates a unique user rate (UU rate) among users of a target layer on the basis of the viewable region of the digital signage 300 to which the heat map is applied and the position information of each user's portable terminal stored in the position information server.

This viewable region is assumed to be stored in the heat map generation unit 101 or other storage units (not shown).

Considering that the position information of one user's portable terminal is counted multiple times at the same time slot, the UU rate generation unit 102 performs a process for excluding the position information of the portable terminal counted duplicately so that the user becomes unique. The exclusion process is performed by excluding duplicate IDs using the IDs of the portable terminals.

In the present disclosure, the number of pieces of position information is counted in units of one hour, and it is possible to count a plurality of pieces of position information of the same portable terminal in the one hour. In such a case, the duplicate position information is processed to be excluded.

FIG. 9 is a diagram illustrating a procedure of calculating the cumulative total number of users generated by the UU rate generation unit 102. Meanwhile, FIG. 9 deals with the number of users using the number of pieces of user position information, not the number of views. As shown in FIG. 9(*a*), the UU rate generation unit 102 calculates the cumulative number of unique users of a target layer for each time slot. The number of target unique users is defined as follows.

A (D, i): number of target UUs at distribution time within i hours on all distribution surfaces D D indicates the digital signage, and i indicates the elapsed time from the start time (for example, 7 o'clock).

Meanwhile, duplicate users are calculated to be removed as described above.

Next, the UU rate generation unit 102 calculates the total number of target users for each time slot of each unit of digital signage 300. The "distribution surface" in the drawing means the display screen of the digital signage 300, and in FIG. 9(*a*), there are N units of digital signage 300. The total number of target users for each time slot is the number of pieces of position information of users serving as a target layer among the number of pieces of position information of users corresponding to each time slot and each unit of digital signage. Here, it is the number of pieces of position information obtained by acquiring a plurality of pieces of position information and duplicately counting them.

FIG. 9(*b*) is a diagram in which the cumulative total number of users of all the units of digital signage 300 is calculated. The cumulative total number of users is the number of users obtained by adding up the total number of target users for each time slot (the number of pieces of position information) in each unit of digital signage for each time slot and further accumulating it as the time slot elapses. For example, in FIG. 9(*b*), the cumulative total number of users shown at time slot 9 o'clock indicates the number of users (the number of pieces of position information) from 7 o'clock to 9 o'clock. Meanwhile, in the present disclosure, the number of pieces of position information from 7 o'clock to 23 o'clock is counted.

The cumulative total number of users B' (D, i) is defined as in the following Formula (1).

[Formula 1]

$$B'(D, i) = \sum_{d \in D} \sum_{\substack{t \in T_d \\ t \leq i}} B(d, t) \qquad (1)$$

B (d, t): number of target UUs for one hour at time t on distribution surface d (total number of target users for each time slot)

B' (D, i): sum of total number of target people at distribution time within i hours on all distribution surfaces D The UU rate generation unit 102 then calculates the UU rate (unique user rate) by dividing the cumulative total number of users by the number of target UUs (the number of unique users). The following Formula (2) is a formula for calculating the UU rate. As described above, D is the distribution surface, and i is the elapsed time.

[Formula 2]

$$r(D, i) = \frac{A(D, i)}{B'(D, i)} \qquad (2)$$

Figure 10:
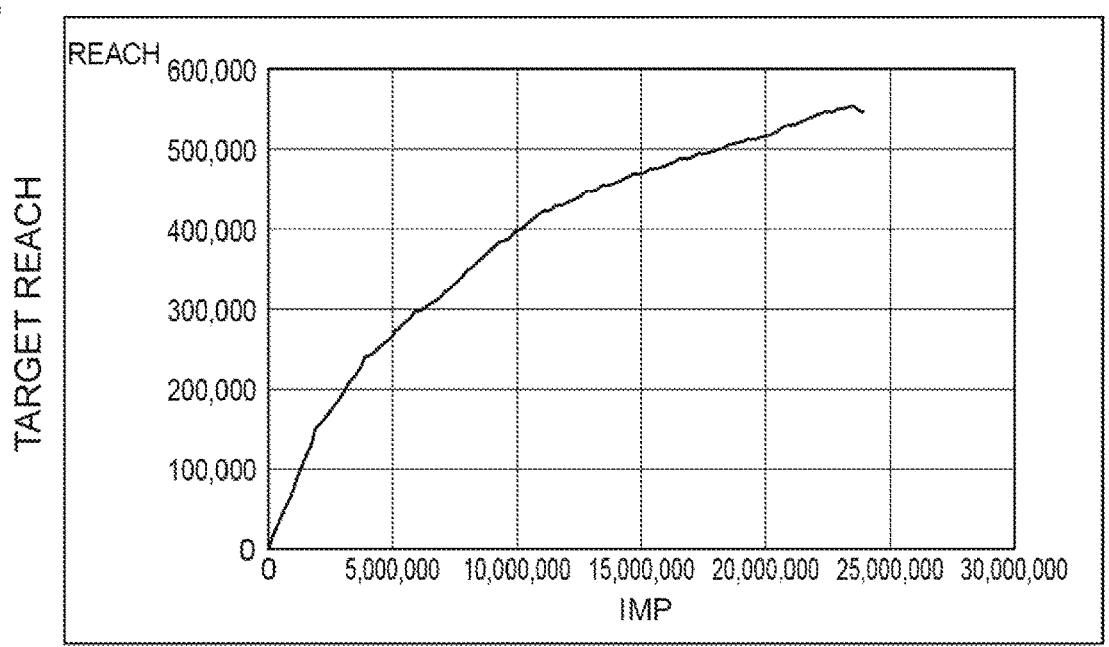
FIG. 10 is a diagram illustrating a table for calculating target reach on the basis of a target IMP and a UU rate and a diagram illustrating a reach curve.

The reach curve generation unit 103 is a portion that calculates the target reach (the number of unique users of the target layer) of the digital signage 300 to which the heat map is applied and generates a reach curve with the overall IMP (the number of views) which is the overall impression to which the heat map is applied as the horizontal axis. FIG. 10(*a*) is a diagram illustrating a table for calculating a target reach on the basis of the target IMP and the UU rate. The reach curve generation unit 103 calculates the target reach by multiplying the target IMP and the UU rate.

Here, the target IMP is obtained by calculating the number of views from the amount of passage of the original data, calculating the number of target views in the digital signage 300 to which the heat map is applied and the cumulative total for each day and for each time slot, and obtaining it as a cumulative target IMP. The target reach is calculated by multiplying the target IMP by the UU rate. Meanwhile, as described above, the number of views is information obtained by multiplying the amount of passage by a predetermined viewing coefficient (0 or more and 1 or less).

On the other hand, the overall IMP is the cumulative number of views in the digital signage 300 to which the heat map is applied on the basis of the number of views obtained from the original data. The cumulative IMP is obtained by taking the cumulative total for each day and for each time slot. The overall IMP is a numerical value indicating the overall IMP (impression: the number of views) to which the heat map is applied without being limited to a specific target layer. Meanwhile, the overall IMP in FIG. 5 indicates each time slot, and the overall IMP in FIG. 10 indicates the cumulative value over time (the cumulative total number of views).

The reach curve generation unit 103 then generates a reach curve with the target reach on the vertical axis and the overall IMP on the horizontal axis (FIG. 10(*b*)).

The target IMP Simp and the target reach R are defined as in the following Formulas (3) and (4).

[Formula 3]

$$S_{imp}(D, i) = \sum_{d \in D} \sum_{\substack{t \in T_d \\ t \leq i}} H_{imp}(d, t) \qquad (3)$$

H_imp (d, t): target IMP for one hour at time t on distribution surface d (acquired by number-of-views data)

S_imp (D, i): total sum of target IMP at distribution time within i hours on all distribution surfaces D $$R(D,j)=S_{imp}(D,j)*T(D,i) \qquad \text{[Formula 4]}$$

R (D, j): target reach at distribution time within i hours on all distribution surfaces D The evaluation unit 104 is a portion that evaluates a generated reach curve. The evaluation is performed in terms of how efficiently the target reach was extended. For example, the evaluation unit 104 performs an evaluation on the basis of the number of target reaches when the overall IMP is a predetermined value designated by an operator (for example, the number of viewers is ten million). In the present disclosure, a plurality of heat maps are generated by generating heat maps of multiple patterns and adding the heat maps generated using a genetic algorithm. The evaluation is performed by comparing the target reaches in a case where these heat maps are applied.

The genetic algorithm execution unit 105 is a portion that processes a known genetic algorithm by applying a heat map as a gene. That is, the genetic algorithm execution unit 105 treats multiple types of heat maps generated by the heat map generation unit 101 as genes, and performs a crossover process and a mutation process on a heat map which is highly evaluated by the evaluation unit 104.

As a premise for performing a genetic algorithm, the heat map generation unit 101 generates a heat map indicating the necessity of advertisement distribution by performing clustering on the basis of the positional relationship among the digital signage 300 and a heat map indicating the necessity of advertisement distribution by clustering the digital signage 300 on the basis of the user correlation, in addition to a heat map indicating the necessity of advertisement distribution on the basis of the content rate as described above.

In addition, the heat map generation unit 101 may create a heat map in which the content rate and the positional relationship among the digital signage 300 are combined with each other, a heat map in which the content rate and the user correlation are combined with each other, a heat map in which the positional relationship among the digital signage 300 and the user correlation are combined with each other, and other heat maps that randomly indicate the necessity of distribution. The heat map generation unit 101 sets these generated heat maps as initial genes of the genetic algorithm.

Figure 11:
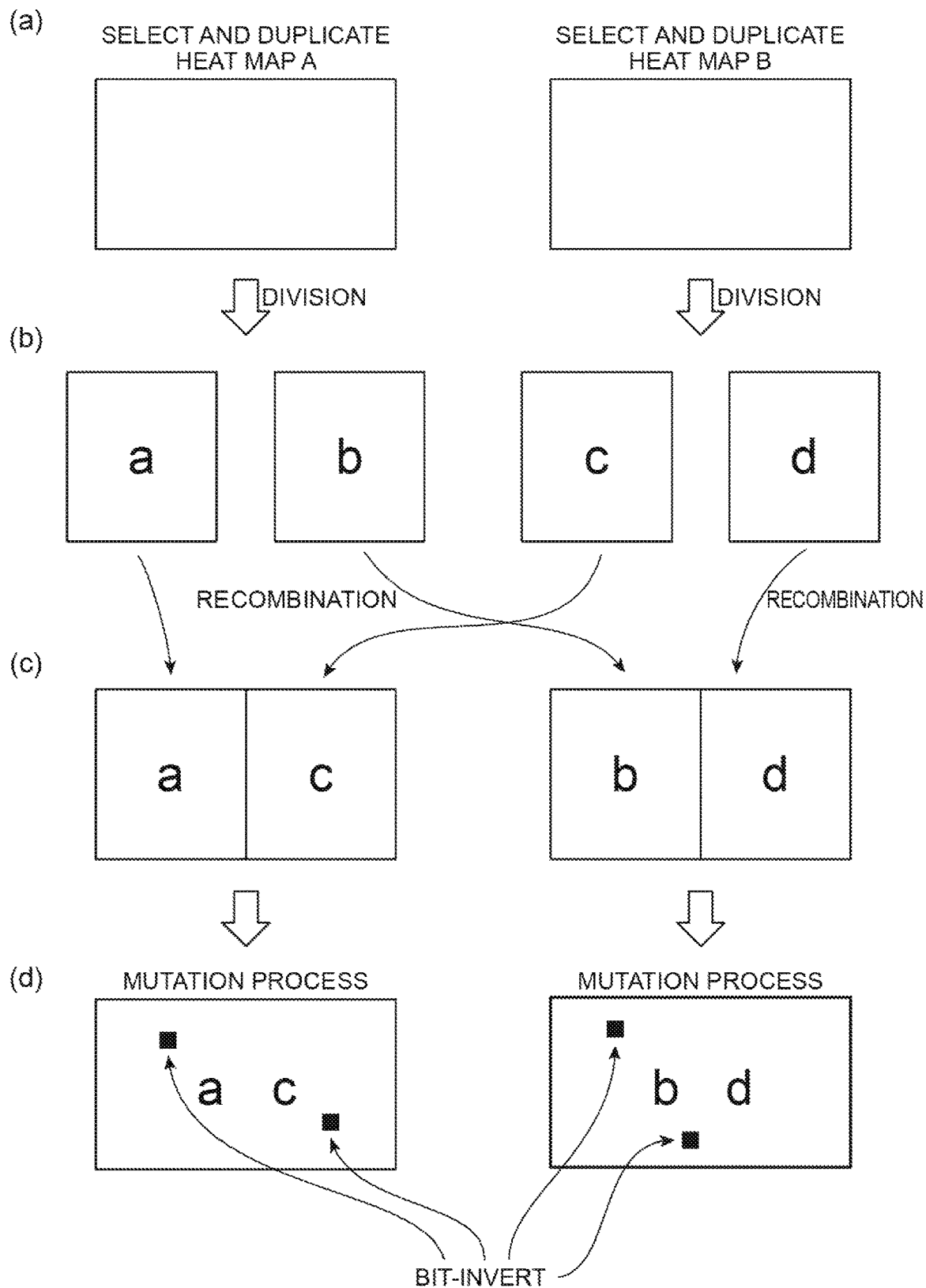
FIG. 11 is a diagram illustrating specific processing of a genetic algorithm in which a heat map is applied to a gene.

FIG. 11 is a diagram illustrating specific processing of a genetic algorithm in which a heat map is applied to a gene. As shown in the drawing, the genetic algorithm execution unit 105 selects and duplicates a heat map evaluated highest by the evaluation unit 104 and the second highest heat map among the initial genes of the heat maps set by the heat map generation unit 101. The genetic algorithm execution unit 105 then performs a crossover process using the selected heat map.

In FIG. 11, a heat map A and a heat map B are selected (culled) and duplicated as a heat map with high evaluation. That is, all but the heat maps A and B are eliminated. Each of the selected heat maps A and B is then divided by the distribution surface (digital signage axis) or time slot, and a new heat map is generated by combining the divided portions with the other heat map.

In FIG. 11(b), divided by the distribution surface, the heat map A is divided into divided portions a and b, and the heat map B is divided into divided portions c and d. As shown in FIG. 11(c), each divided portion is combined with a divided portion on a different heat map side. In the drawing, the divided portion a and the divided portion c are combined with each other, the divided portion b and the divided portion d are combined with each other, and thus new heat maps are generated.

Further, the genetic algorithm execution unit 105 performs a mutation process by randomly bit-inverting a portion of the new heat map (inverting the necessity of distribution). The portion of the heat map indicates one square specified by the distribution surface and the time slot. In FIG. 11(d), any portion of bits in the new heat map is inverted, and the mutation process is performed.

The UU rate generation unit 102 and the reach curve generation unit 103 then generate a reach curve with respect to the heat map generated by applying the genetic algorithm, and the evaluation unit 104 evaluates the effect of the heat map.

The genetic algorithm execution unit 105 duplicates, divides, and crosses the heat map repeatedly a predetermined number of times.

Through such a process, it is possible to determine a heat map with a high effect from a plurality of heat maps.

Figure 12:
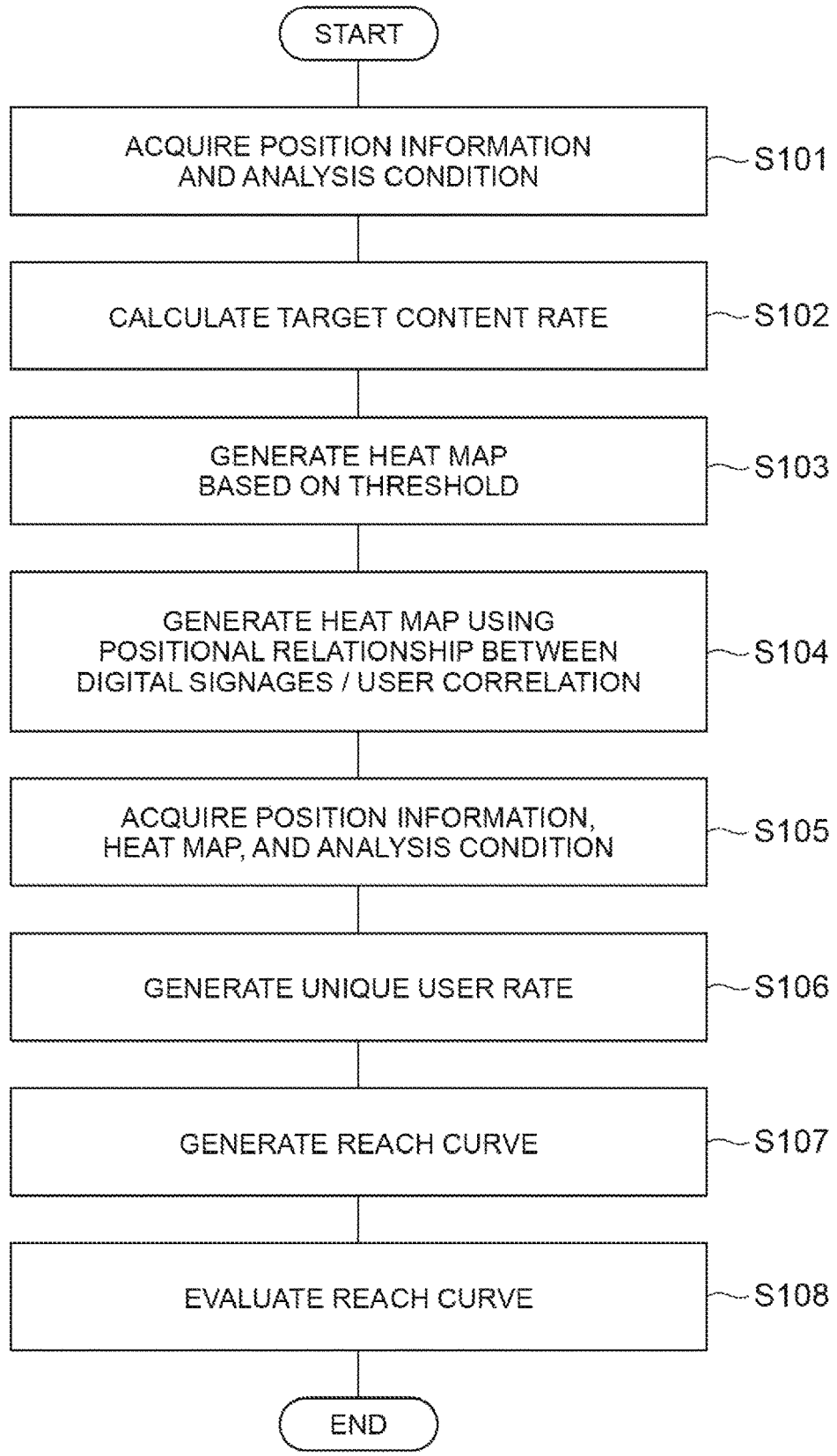
FIG. 12 is a flowchart illustrating an operation of an advertisement management device 100.

Next, an operation of the advertisement management device 100 in the present disclosure will be described. FIG. 12 is a flowchart illustrating an operation the advertisement management device 100, and shows an operation of a pattern that does not use the genetic algorithm.

The heat map generation unit 101 acquires user position information and target conditions (attribute information) which are analysis conditions (S101), calculates the overall IMP and the target IMP, and calculates the target content rate at each time slot and each the digital signage 300 (S102). The heat map generation unit 101 generates a heat map on the basis of the target content rate and the threshold (S103). Further, the heat map generation unit 101 generates a heat map clustered according to the positional relationship among the digital signage 300 and a heat map clustered using the user correlation (S104).

In order to perform an evaluation process on a heat map, the UU rate generation unit 102 acquires position information, a heat map, and analysis conditions (S105). The analysis condition here includes a reference IMP serving as a reference value for evaluation. The UU rate generation unit 102 generates a unique user rate for each heat map generated using the position information, the heat map, and the analysis condition (S106). The reach curve generation unit 103 generates a reach curve using the unique user rate (S107).

The evaluation unit 104 then evaluates the generated reach curve (S108). As described above, the evaluation unit 104 generates a reach curve for each heat map, and evaluates each generated reach curve on the basis of the target reach at the reference IMP (reference value) of the overall IMP designated as the analysis condition. This evaluation of the reach curve is the evaluation of the heat map.

Figure 13:
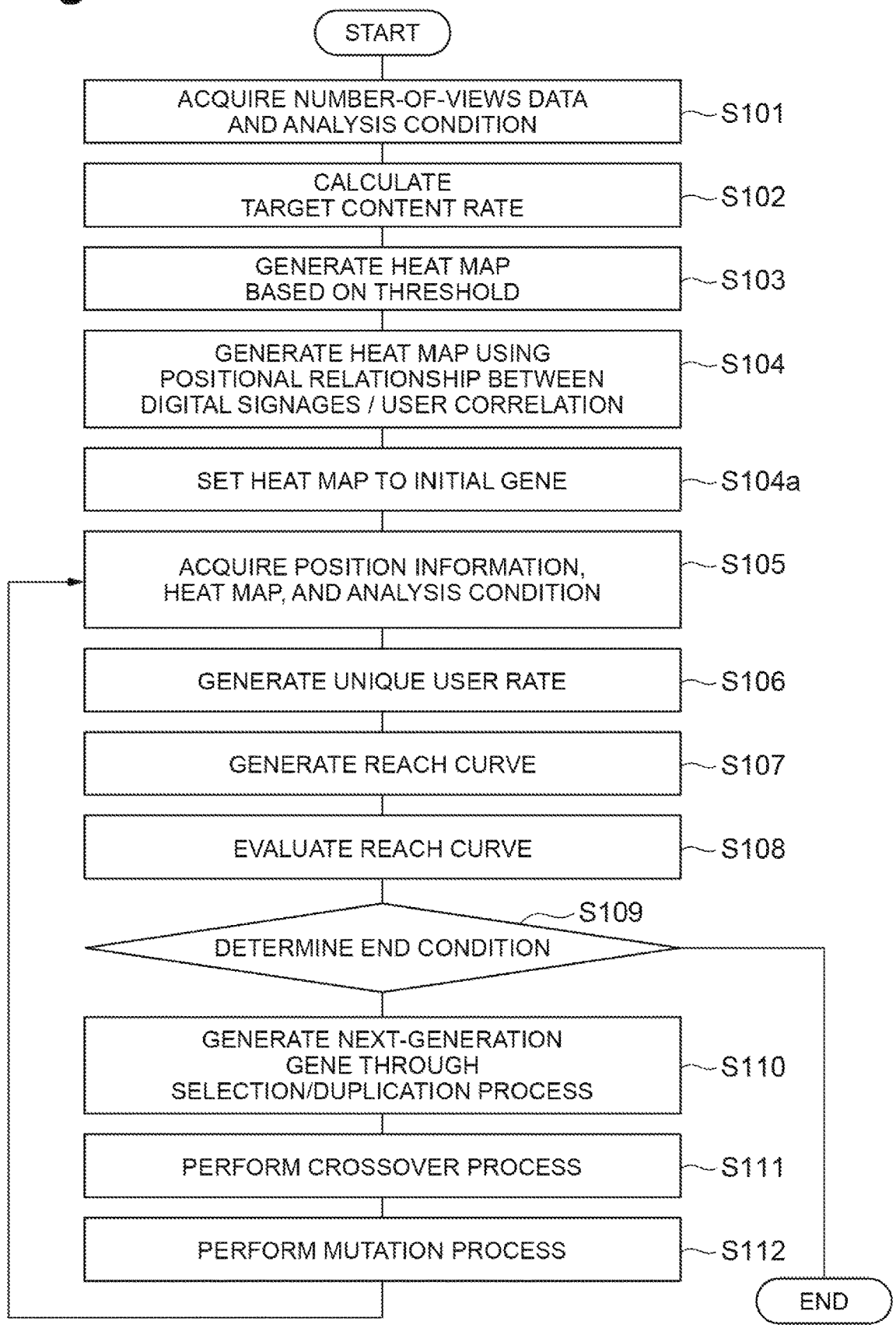
FIG. 13 is a flowchart illustrating a process of generating and analyzing a heat map using a genetic algorithm.

Next, a process of generating and analyzing a heat map using a genetic algorithm will be described. FIG. 13 is a flowchart illustrating the operation.

The heat map generation unit 101 acquires user position information, a target which is an analysis condition, and a reference value for evaluation (S101), calculates the overall IMP and the target IMP, and calculates the target content rate at each time slot and each the digital signage 300 (S102). The heat map generation unit 101 generates a heat map on the basis of the target content rate and the threshold (S103). Further, the heat map generation unit 101 generates a heat map clustered according to the positional relationship among the digital signage 300 and a heat map clustered using the user correlation (S104). The heat map generation unit 101 sets each generated heat map as an initial gene of the genetic algorithm (S104a).

In order to perform an evaluation process on a heat map, the UU rate generation unit 102 acquires position information, a heat map, and analysis conditions (here, the reference IMP) (S105). The UU rate generation unit 102 generates a unique user rate for each generated heat map using the position information, the heat map, and the analysis conditions (S106). The reach curve generation unit 103 generates a reach curve using the unique user rate (S107).

The evaluation unit 104 then evaluates the generated reach curve (S108). As described above, the evaluation unit 104 generates a reach curve for each heat map, and performs an evaluation on the basis of the target reach at the reference value of the overall IMP designated as the analysis condition. This evaluation of the reach curve is the evaluation of the heat map.

Further, a heat map generation process using a genetic algorithm is performed. The genetic algorithm execution unit 105 generates a next-generation gene (heat map) through a selection/duplication process (S110). The genetic algorithm execution unit 105 then performs a crossover process (S111), and performs a mutation process (S112). These processes S110 to S112 are repeatedly performed until the end condition is satisfied (S109). The end condition is, for example, the number of time of processing, and ends after the evaluation is repeated a predetermined number of times.

Next, the operational effects of the advertisement management device 100 in the present disclosure will be described. The advertisement management device 100 of the present disclosure is an information distribution management device configured to manage the advertisement distribution device 200 that distributes information to the digital signage 300 which are a plurality of advertisement display devices. The advertisement management device 100 includes the heat map generation unit 101 configured to generate a heat map indicating the necessity of advertisement distribution to the designated target layer for each of a plurality of units of digital signage 300 and for each time slot, the reach curve generation unit 103 configured to function as a viewing estimation unit that estimates the target reach R which is the number of unique viewing users who are unique users of the target layer and the overall IMP which is the number of views by all users for the digital signage 300 to which the heat map is applied, and the evaluation unit 104 configured to evaluate the heat map on the basis of the target reach R and the overall IMP which is all users to whom the heat map is applied.

According to this disclosure, it is possible to evaluate the effect of distribution based on the number of unique users of the target layer. Therefore, it is possible to obtain a motivation for extending unique users. For example, in a case where the evaluation is bad, it is possible to obtain a motivation to generate a different heat map with a high effect. Thus, it is possible to improve the cost effectiveness of advertising.

In the present disclosure, the heat map generation unit 101 generates multiple types of heat maps, the reach curve generation unit 103 estimates the number of views for each of multiple types of heat maps, and the evaluation unit 104 evaluates the multiple types of heat maps. Meanwhile, in the present disclosure, the number of unique users of the target user at the reference value of the overall IMP is referred to as the target reach, but the evaluation may be performed on the basis of the number of unique users who are target users who have viewed N times or more (N is an integer equal to or greater than 2). In that case, the number of unique users is an index obtained by reflecting the viewing frequency of the target.

In this way, a plurality of heat maps are evaluated, and thus the advertisement provider or its operator can select a heat map with a high effect from among them.

In addition, the present disclosure further includes the UU rate generation unit 102 configured to function as a unique user rate calculation unit that calculates the number of unique users of the target layer and the total number of users for the plurality of units of digital signage 300 using position information of portable terminals and calculates a unique user rate for each time slot using the number of unique users and the total number of users. The reach curve generation unit 103 uses the unique user rate to estimate the target reach which is the number of unique viewing users of the target layer. In the above disclosure, the cumulative total number of users is used, but there is no limitation thereto, and the UU rate may be calculated for each time slot.

According to this process, it is possible to obtain a unique user rate on the basis of the number of pieces of position information, and to calculate the number of unique viewing users using this.

In addition, in the present disclosure, the reach curve generation unit 103 calculates the target reach (the number of unique viewing users) which is the cumulative number of unique users for each time slot corresponding to the heat map. The evaluation unit 104 evaluates the heat map using the overall IMP (the number of views by all users) which is the number of views by all users to which the heat map is applied and the target reach (the number of unique viewing users) accumulated for each time slot. The evaluation is performed, for example, on the basis of the target reach corresponding to a designated reference value in the overall IMP. The evaluation may be performed on the basis of whether the target reach at that time is equal to or greater than a threshold, or the evaluation may be performed by comparison with a target reach in another heat map.

The heat map generation unit 101 generates the heat map on the basis of the total number of users and the number of users of a designated target layer in an information viewing region of the digital signage 300, and on the basis of the digital signage 300 and the content rate calculated for each time slot.

Generally, generating a heat map on the basis of the content rate of the target layer is considered to have a high distribution effect.

In addition, the heat map generation unit 101 may generate the heat map on the basis of the correlation between users in the information viewing regions of the plurality of units of digital signage 300.

In addition, the heat map generation unit 101 may generate the heat map on the basis of the positional relationship between the plurality of units of digital signage 300.

In addition, the advertisement management device 100 further includes the genetic algorithm execution unit 105 configured to function as a new generation unit that generates a new heat map by combining a plurality of heat maps generated by the heat map generation unit 101. The reach curve generation unit 103 estimates the number of viewers (viewing frequency) using the new heat map, and the evaluation unit 104 performs an evaluation using the new heat map. Here, the new heat map is generated using a genetic algorithm, but it is of course not limited to this, and may be replaced with a similar process.

This makes it possible to generate various kinds of heat maps, and to generate heat maps of different elements over generations.

The genetic algorithm execution unit 105 generates a new heat map so that the number of views by all users in a case where the new heat map is applied, that is, the overall IMP, is equal to or greater than the threshold.

In addition, the genetic algorithm execution unit 105 divides each of the plurality of heat maps generated by the heat map generation unit 101 into several portions, and generates a new heat map by combining the portions. At that time, this new heat map is generated so as to include a portion corresponding to the digital signage 300 having a predetermined positional relationship among the plurality of units of digital signage 300.

The genetic algorithm execution unit 105 divides each of the plurality of heat maps generated by the heat map generation unit 101 into several portions, and generates a new heat map by combining the portions. At that time, the new heat map is generated so as to include a portion corresponding to the digital signage 300 having a high user correlation among the plurality of units of digital signage 300.

In addition, the genetic algorithm execution unit 105 randomly selects a portion indicating the necessity of information distribution for the plurality of units of digital signage 300 and time slots, which constitutes the new heat map, and performs a so-called mutation process of inverting the necessity.

This makes it possible to generate a heat map composed of various elements, and to generate a heat map of which the evaluation is improved.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 14:
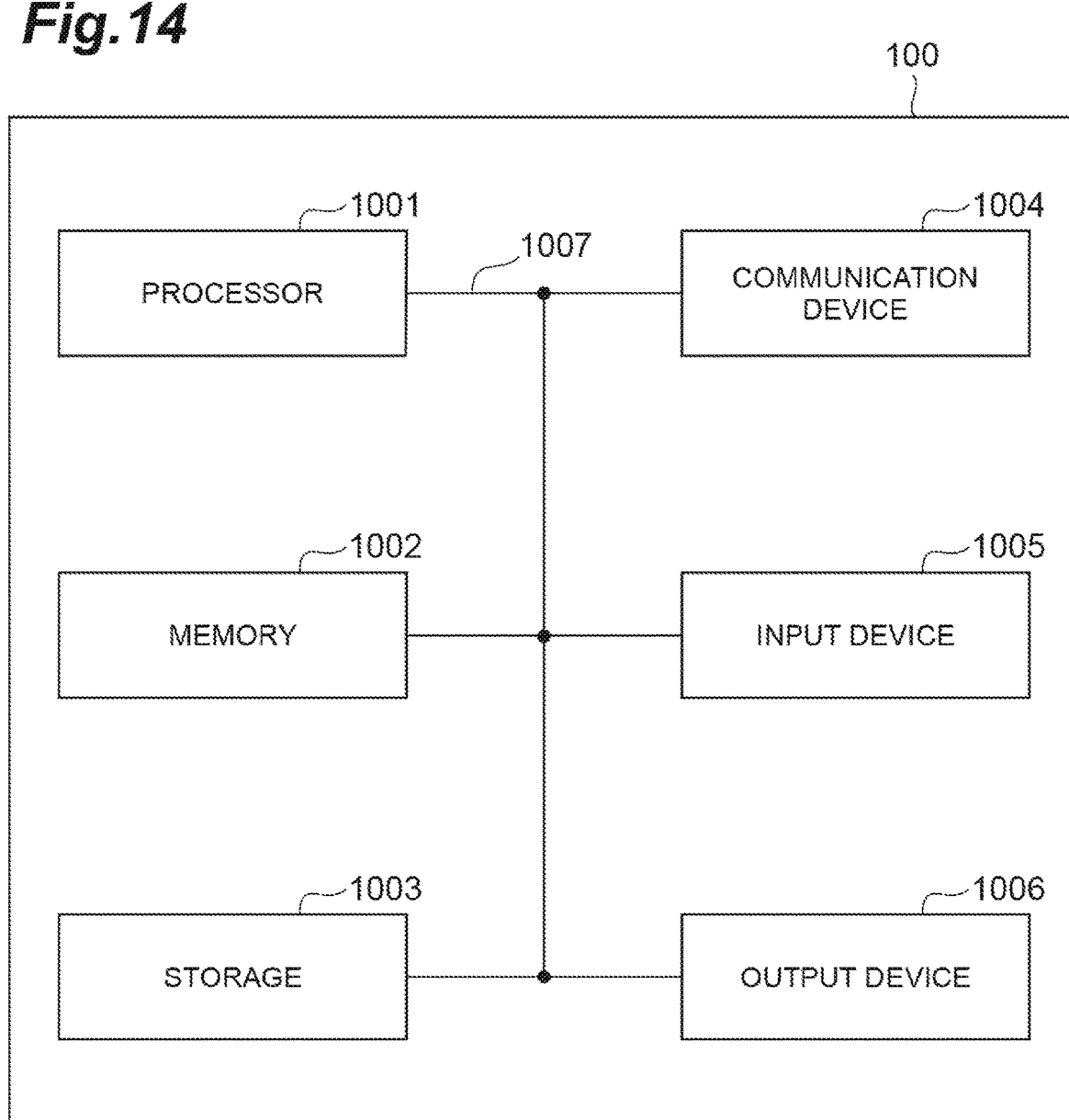
FIG. 14 is a diagram illustrating an example of a hardware configuration of the advertisement management device 100 according to an embodiment of the present disclosure.

For example, the advertisement management device 100 according to one embodiment of the present disclosure may function as a computer that performs processing of an advertisement distribution evaluation method in an interactive process according to the present disclosure. FIG. 14 is a view showing an example of the hardware configuration of the advertisement management device 100 according to one embodiment of the present disclosure. The advertisement management device 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the advertisement management device 100 may be configured to include one or a plurality of the devices shown in the drawings or may be configured without including some of those devices.

The functions of the advertisement management device 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the heat map generation unit 101 and UU rate generation unit 102 described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the heat map generation unit 101 in the interactive system 100 and the like may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing an advertisement distributing analysis method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the advertisement management device 100 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning. For example, at least one of a channel and a symbol may be a signal (signaling). Further, a signal may be a message. Furthermore, a component carrier (CC) may be called a cell, a frequency carrier, or the like.

The terms "system" and "network" used in the present disclosure are used to be compatible with each other.

Further, the information, parameters and the like described in the present disclosure may be expressed using absolute values, relative values from a predetermined value, or other corresponding information.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner.

REFERENCE SIGNS LIST

100 Advertisement management device
200 Advertisement distribution device
101 Heat map generation unit
102 UU rate generation unit
103 Reach curve generation unit
104 Evaluation unit
105 Genetic algorithm execution unit

The invention claimed is:

1. An information distribution management device configured to manage an information distribution device that distributes information to a plurality of information display devices, the management device comprising:
processing circuitry configured to
generate a heat map indicating the necessity of information distribution to a designated target layer for each of the plurality of information display devices and for each time slot;
estimate the number of users of unique viewing by unique users of the target layer and the number of views by all users for an information display device to which the heat map is applied; and
evaluate the heat map on the basis of the number of unique viewing users of the target layer and the number of views by all users to which the heat map is applied, wherein the processing circuitry
estimates the number of unique viewing users which is the cumulative number of viewing users of the target layer for each time slot corresponding to the heat map,
evaluates the heat map using the number of views by all users to which the heat map is applied and the number of unique viewing users of the target layer accumulated for each time slot,
generates the heat map on the basis of a target content rate calculated for each information display device and for each time slot on the basis of the number of views by all users and the number of target views by users of the designated target layer in an information viewing region of the information display device, and
wherein the information display device is a digital signage arranged indoors or outdoors, and arranged for viewing by a plurality of users who pass indoors or outdoors,
wherein the processing circuitry generates the heatmap based on user location information, positioning time, and target information,
wherein the processing circuitry generates the heatmap based on a total number of views, a target number of views, and target inclusion rate,
wherein the total number of views is the number of viewings of the information display device and is based on the number of people who pass through the viewable area of the information display device, the target number of views is the number of viewings of the information display device by the target users and is based on the number of people who pass through the viewable area of the information display device, and
wherein the target inclusion rate is the value obtained by dividing the target number of views by the total number of views.

2. The information distribution management device according to claim 1, wherein the processing circuitry generates multiple types of heat maps,
the processing circuitry estimates the number of unique viewing users and the number of views by all users for each of the multiple types of heat maps, and
the processing circuitry evaluates multiple types of heat maps.

3. The information distribution management device according to claim 1, wherein the processing circuitry is configured to calculate the number of unique users of the target layer and the total number of users for the plurality of information display devices using position information of portable terminals and to calculate a unique user rate for each time slot using the number of unique users and the total number of users,
wherein the processing circuitry estimates the number of unique viewing users of the target layer using the unique user rate.

4. The information distribution management device according to claim 1, wherein the processing circuitry generates the heat map on the basis of a correlation between users in an information viewing region of the plurality of information display devices.

5. The information distribution management device according to claim 1, wherein the processing circuitry generates the heat map on the basis of a positional relationship between the plurality of information display devices.

6. The information distribution management device according to claim 2, wherein the processing circuitry is configured to generate a new heat map by combining a plurality of heat maps generated by the processing circuitry,
wherein the processing circuitry estimates the number of unique viewing users and the number of views by all users using the new heat map, and
the processing circuitry performs an evaluation using the new heat map.

7. The information distribution management device according to claim 6, wherein the processing circuitry generates a new heat map using a genetic algorithm.

8. The information distribution management device according to claim 6, wherein the processing circuitry generates a new heat map so that the number of views by all users in a case where the new heat map is applied is equal to or greater than a threshold.

9. The information distribution management device according to claim 6, wherein the processing circuitry divides each of the generated plurality of heat maps into several portions and combines the portions to generate a new heat map, and
the new heat map includes portions corresponding to information display devices having a predetermined positional relationship among the plurality of information display devices.

10. The information distribution management device according to claim 6, wherein the processing circuitry divides each of the generated plurality of heat maps into several portions and combines the portions to generate a new heat map, and
the new heat map includes portions corresponding to information display devices having a high user correlation among the plurality of information display devices.

11. The information distribution management device according to claim 6, wherein the processing circuitry randomly selects a portion indicating the necessity of information distribution for the plurality of information display devices and time slots, which constitutes the new heat map, and inverts the necessity.

12. The information distribution management device according to claim 2, wherein the processing circuitry is configured to calculate the number of unique users of the target layer and the total number of users for the plurality of information display devices using position information of portable terminals and to calculate a unique user rate for each time slot using the number of unique users and the total number of users,
wherein the processing circuitry estimates the number of unique viewing users of the target layer using the unique user rate.

13. The information distribution management device according to claim 2, wherein the processing circuitry estimates the number of unique viewing users which is the cumulative number of viewing users of the target layer for each time slot corresponding to the heat map, and
the processing circuitry evaluates the heat map using the number of views by all users to which the heat map is applied and the number of unique viewing users of the target layer accumulated for each time slot.

14. The information distribution management device according to claim 3, wherein the processing circuitry estimates the number of unique viewing users which is the cumulative number of viewing users of the target layer for each time slot corresponding to the heat map, and
the processing circuitry evaluates the heat map using the number of views by all users to which the heat map is applied and the number of unique viewing users of the target layer accumulated for each time slot.

15. The information distribution management device according to claim 2, wherein the processing circuitry generates the heat map on the basis of a target content rate calculated for each information display device and for each time slot on the basis of the number of views by all users and the number of target views by users of the designated target layer in an information viewing region of the information display device.

16. The information distribution management device according to claim 3, wherein the processing circuitry generates the heat map on the basis of a target content rate calculated for each information display device and for each time slot on the basis of the number of views by all users and the number of target views by users of the designated target layer in an information viewing region of the information display device.

17. The information distribution management device according to claim 2, wherein the processing circuitry generates the heat map on the basis of a correlation between users in an information viewing region of the plurality of information display devices.

18. The information distribution management device according to claim 1, wherein the processing circuitry generates a reach curve.

19. The information distribution management device according to claim 1, wherein the digital signage displays advertisements, and the heatmap indicates an evaluation of the advertisements.

* * * * *